United States Patent [19]

Kindell

[11] 4,041,292
[45] Aug. 9, 1977

[54] HIGH SPEED BINARY MULTIPLICATION SYSTEM EMPLOYING A PLURALITY OF MULTIPLE GENERATOR CIRCUITS

[75] Inventor: Jerry L. Kindell, Phoenix, Ariz.

[73] Assignee: Honeywell Information Systems Inc., Waltham, Mass.

[21] Appl. No.: 642,844

[22] Filed: Dec. 22, 1975

[51] Int. Cl.² .............................................. G06F 7/52
[52] U.S. Cl. .................................................. 235/164
[58] Field of Search ....................................... 235/164

[56] References Cited

U.S. PATENT DOCUMENTS

| | | | |
|---|---|---|---|
| 3,372,269 | 5/1968 | MacSorley et al. | 235/164 |
| 3,691,359 | 9/1972 | Dell et al. | 235/164 |
| 3,761,698 | 9/1973 | Stephenson | 235/164 |
| 3,949,209 | 4/1976 | Fett | 235/164 |

OTHER PUBLICATIONS

J. E. Partridge, "Cascade Adder for Multiply Operations" *IBM Tech. Disclosure Bulletin* Jan., 1971, pp. 2406-2407.

R. L. Haven, "Multiplying Circuit" *Western Electric Technical Digest* No. 26 Apr. 1972, pp. 37-38.

*Primary Examiner*—David H. Malzahn
*Attorney, Agent, or Firm*—Faith F. Driscoll; Nicholas Prasinos; Ronald T. Reiling

[57] ABSTRACT

A multiplication apparatus comprises a plurality of multiple generator circuits, each of which simultaneously generates binary signals representative of a predetermined multiple of a multiplicand for different digits of a group of multiplier digits. A different one of the multiple generator circuits couples to a different one of a plurality of serially connected adder circuits for applying the binary signals. Each of the multiple generator circuits includes storage circuits coupled to receive timing signals from a common source to enable an overlap in the generation of binary multiple signals minimizing the number of multiplication cycles required to perform a multiplication operation in response to multiply instructions.

25 Claims, 7 Drawing Figures

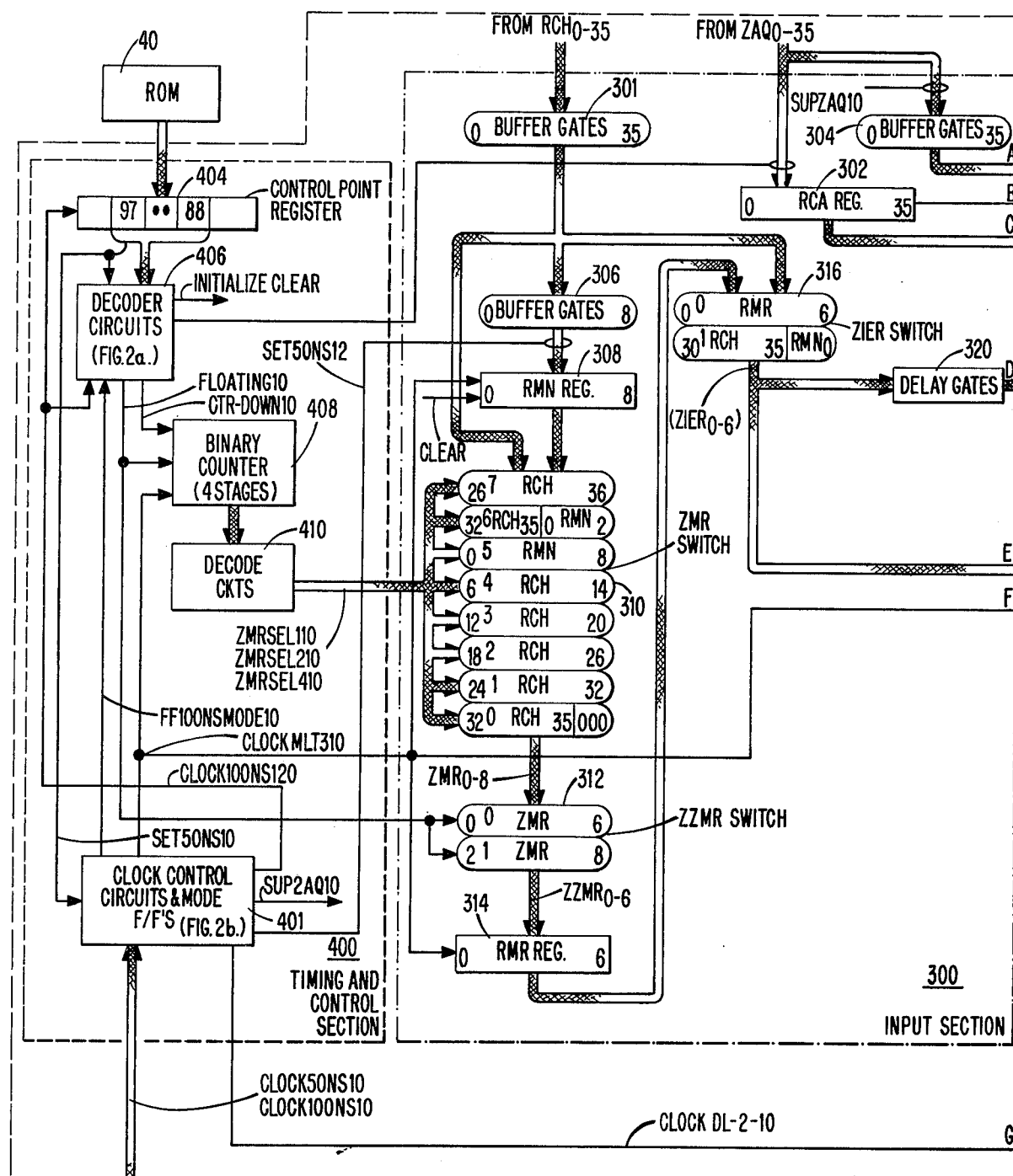
Fig. 1 (Sheet 1 of 2).

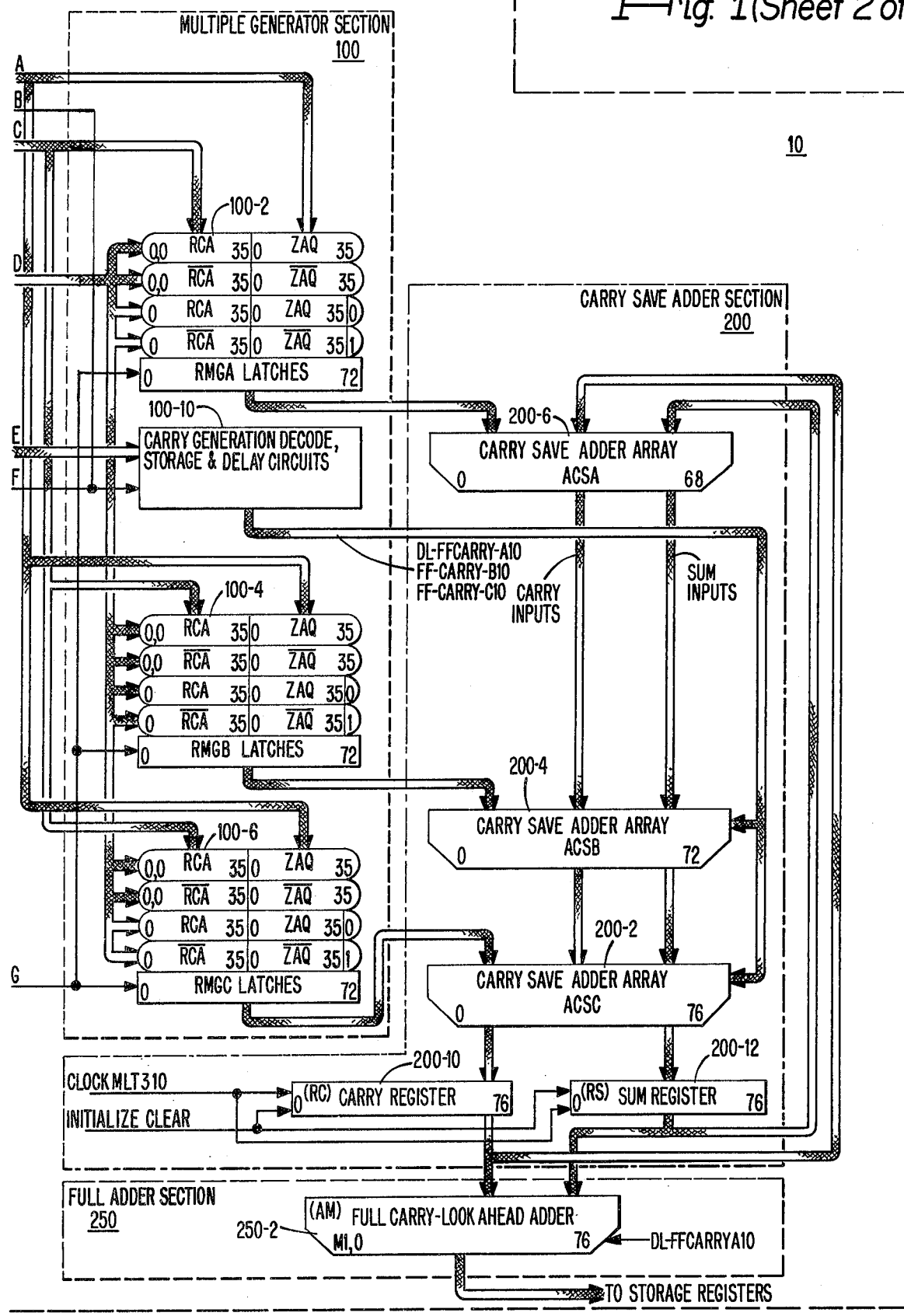
Fig. 1 (Sheet 2 of 2).

HIGH SPEED BINARY MULTIPLICATION SYSTEM EMPLOYING A PLURALITY OF MULTIPLE GENERATOR CIRCUITS

RELATED PATENT APPLICATIONS

1. Multiple Generating Register invented by D. L. Fett bearing Ser. No. 565,182, now U.S. Pat. No. 3,949,209, filed on Apr. 4, 1975 and assigned to the same assignee as named herein.
2. Current Mode Carry Look-Ahead Array invented by H. W. Miller bearing Ser. No. 562,327, now U.S. Pat. No. 3,925,652, filed on Mar. 26, 1975 and assigned to the same assignee as named herein.
3. Selector Latch Gate invented by D. L. Fett bearing Ser. No. 484,373, now U.S. Pat. No. 3,953,746, filed June 28, 1974 and assigned to the same assignee as named herein.
4. Current Mode Arithmetic Logic Array invented by H. W. Miller bearing Ser. No. 562,316, now U.S. Pat. No. 3,925,651, filed on Mar. 26, 1975, and assigned to the same assignee as named herein.
5. Current Mode Carry Save Adder invented by H. W. Miller bearing Ser. No. 618,709, filed Oct. 1, 1975, and assigned to the same assignee as named herein.
6. Multiple Generating Register invented by J. L. Kindell bearing Ser. No. 642,845 filed on Dec. 22, 1975 and assigned to the same assignee as named herein.

BACKGROUND OF THE INVENTION

1. Field of Use

This invention relates to multiplication system and apparatus, more particularly to system for multiplying numbers in binary form.

2. Prior Art

In general, it is well known to perform multiplication operations by generating required multiples of a multiplicand during a multiplication operation in contrast to prestoring multiples. An example of this certain type of apparatus is disclosed in U.S. Pat. No. 3,730,425 and assigned to the same assignee as name herein. The patented apparatus operates to multiply the multiplier by two (i.e., shifts the multiplier left one bit) before beginning the multiplication operation. Thereafter, during the multiplication operation, circuits included in the multiplication apparatus select one of a number of multiplication factors in accordance with pairs of multiplier bits. While the patented apparatus halves the number of cycles normally required for a multiplication operation, the time for performing a multiply operation is still considerable especially where the apparatus is required for use in a system which employs high speed circuits such as current mode logic circuits. Also, as discussed in the subject patent, others have suggested speeding up multiplication by examining multiplier bits in pairs, and adding different multiples to a number of series connected adders. An example of this type of multiplication is described in the text, "The Logic of Computer Arithmetic", by Ivan Flores, published by Prentice-Hall Inc., copyright 1963.

Other types of multiplication apparatus have employed prestored multiples which are generated prior to the multiplication operation, the multiples are selected in accordance with the values of multiplier digits. An example of this type of apparatus is disclosed in U.S. Pat. No. 3,641,331 assigned to the same assignee as named herein. While the patented apparatus reduces the number of multiples required to be stored and the time required for generating all of the remaining multiples, considerable time is still required for generating and storing the multiples prior to the multiplication operation.

Accordingly, it is a primary object of the present invention to provide improved multiplication system and method.

It is another object of the present invention to provide binary multiplication apparatus which minimizes the number of cycles required to perform multiplication operations in response to multiply instructions.

it is a further object of the present invention to provide high speed multiply apparatus suitable for operation with high speed integrated circuits.

It is still a further object of the present invention to provide multiply apparatus implementable with high speed integrated circuits such as current mode logic circuits.

SUMMARY OF THE INVENTION

The above objects are achieved in a preferred embodiment of the present invention which includes a plurality of multiple generator circuits, each of which is operative to generate binary signals corresponding to the ZERO, ± one-half and ± one multiples of the multiplicand. A different one of the multiple generator circuits connects to a different one of a plurality of series connected adder circuits. The multiple generator circuits include latch storage circuits which take the form of the circuits disclosed in the patent applications of J. L. Kindell and D. L. Fett, referenced in the introductory portion of this specification.

In the preferred embodiment, there are three adder circuits, each of which is connected to receive the multiple signals from one of a corresponding one of three multiple generator circuits. A common timing source includes circuits for generating timing control signals which are applied to latch circuits included in each multiple generator circuit. The latch circuits store such multiple signals until the timing source enables their replacement by the multiple generated during a previous cycle of operation. In this manner, the apparatus of the invention enables multiple generation operations to be overlapped and to proceed in parallel with the generation of partial products by the adder circuits. This reduces to a minimum the number of cycles normally required to perform a multiplication operation.

The adder circuits of the preferred embodiment take the form of the circuits disclosed in the patent applications of H. W. Miller, also referenced in the introductory portion of the specification. The adder circuits together with the multiple generator circuits are constructed from current mode logic circuits. The organization of the multiplication apparatus of the present invention enables the use of such high speed circuits and reduces the overall complexity of such apparatus. Also, by employing a number of like circuits, the apparatus of the present invention is readily implementable with larger scale and medium scale integrated circuits.

The features and other advantages of the present invention will be better understood when considered in connection with the following description when considered in connection with the accompanying drawings.

BRIEF DESCRIPTION OF THE DRAWINGS

FIG. 1 is a block diagram illustrating the multiplication apparatus of the present invention.

DETAILED DESCRIPTION OF THE PREFERRED EMBODIMENT

Figure 2A:
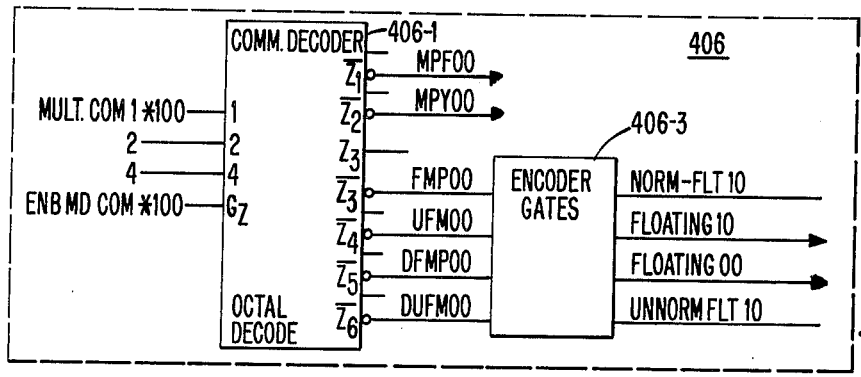
FIG. 2a shows in greater detail, the decoder circuits 406 of FIG. 1.

Referring now to FIG. 1, there is shown a preferred embodiment of the present invention which is a system for multiplying a pair of binary numbers. In the example of the invention chosen for illustration, a 36-bit multiplicand which can be extended with ZEROS fill to a 72-bit multiplicand is multiplied by a 28, 36, or 64-bit multiplier depending upon the particular instruction being executed as explained herein. A 72-bit multiplicand is used in the case of a floating point multiply instruction.

In the case of a 28-bit multiplier, when the bits are not evenly divisible by the number of bits being examined per cycle, the multiplier is extended with ZEROS at the least significant bit end to make the division come out even. As explained herein, with three levels of carry save addition, seven bits of the multiplier are examined at a time, three overlapped groups of multiplier bits (e.g. for the most significant bits 0 through 6, the different groups correspond to bits 0–2, 2–4 and 4–6). The groups select the appropriate multiples for the multiplier digits having actual values 0–7.

The multiplication of the two binary words is controlled by the various control signal levels provided by a microprogrammed control store 40 which in the preferred embodiment forms part of the control portion of a computer system employing the multiplication system of the present invention. From FIG. 1, during a cycle of operation, it is seen that the microinstruction contents of an addressed storage location of the store 40 are read out and stored in a control point register 404 for decoding by the decoder circuits of block 406.

The timing signals for the system of FIG. 1 are provided by external clock circuits of block 20. For the purpose of the present invention, these circuits may be considered conventional in design. The circuits of block 20 provide clock pulses at 100 nanosecond intervals on two sets of lines. The clock pulses on each line are offset from one another by 180°. The clock pulses are applied to the clock control circuits of block 401 of a timing and control section 100 which control the distribution of the clock pulses to the system of FIG. 1 in addition to controlling whether the pulses are distributed at 50 or 100 nanosecond intervals as explained herein.

From FIG. 1, it is seen that the system 10 of the present invention comprises: the timing and control section 400 mentioned above; an input section 300; a multiple generator section 100; a carry save adder section 200; and a full adder and storage section 250.

The Timing And Control Section 400

This section includes the clock control circuits and mode flip-flops of block 401, the control point register 404, the decoder circuits of block 406, a four-stage binary counter 408 and decoder circuits of block 410. The circuits of block 401, shown in greater detail in FIG. 2b, under microprogram control distribute clock pulses at either 100 nanosecond or 50 nanosecond rate. More specifically, multiplier system is controlled by bits 88–97 of microinstruction word, part of which is loaded into the control point register 404 at the beginning of each cycle of operation. The microinstruction word bits are coded as follows:

1. bits 88–89 are type bits which identify the operation or function to be performed. The code 01 identifies the multiply function;

2. bit 90 controls the strobing of the multiplier holding register RCH, not shown, which connects to the input buffer gates 301 via the input lines RCHO-35. The state of this bit is not resident in the control point register 404, but is stored in another control point register, not shown. When bit 90 is a ZERO, no strobe pulse is generated and when bit 90 is a binary ONE, a strobe pulse is applied to the RCH register.

3. bits 91 through 93 designate the type of multiply operation and are used to load the counter 408 which controls the operation of a ZMR switch 310 of section 300. These bits are coded as follows:

| | | |
|---|---|---|
| 000 = NOP | | |
| 001 = MPF = | Multiply fractional, fixed point; | |
| 010 = MPY = | Multiply integer, fixed point; | |
| 011 = FMP = | Single precision, normalized, floating point multiply; | |
| 100 = UFM = | Single precision, unnormalized, floating point multiply; | |
| 101 = DFMP = | Double precision, normalized, floating point multiply; and | |
| 110 = DUFM = | Double precision, unnormalized, floating point multiply. | |

4. bit 94 controls the timing mode for the multiplier system by establishing when the circuits of block 401 will provide clock pulses at 50 and 100 nanosecond rates. When a binary ZERO, the bit designated as SET50NS10 inhibits the circuits of block 401 from generating clock pulses at 50 nanosecond clock rate beginning with the next 100 nanosecond cycle. When a binary ONE, the SET50NS10 signal causes the clock circuits of block 401 to generate clock pulses at a 50 nanosecond rate beginning with the next 100 nanosecond cycle.

5. bit 95 is used to control an output switch, not shown, to which the adder output is delivered.

6. bits 96–97 control the strobing of a register included in the data output path, not shown, and an input RCA register 302 of section 300 defined by the codes 00 and 01, respectively.

Figure 2B:
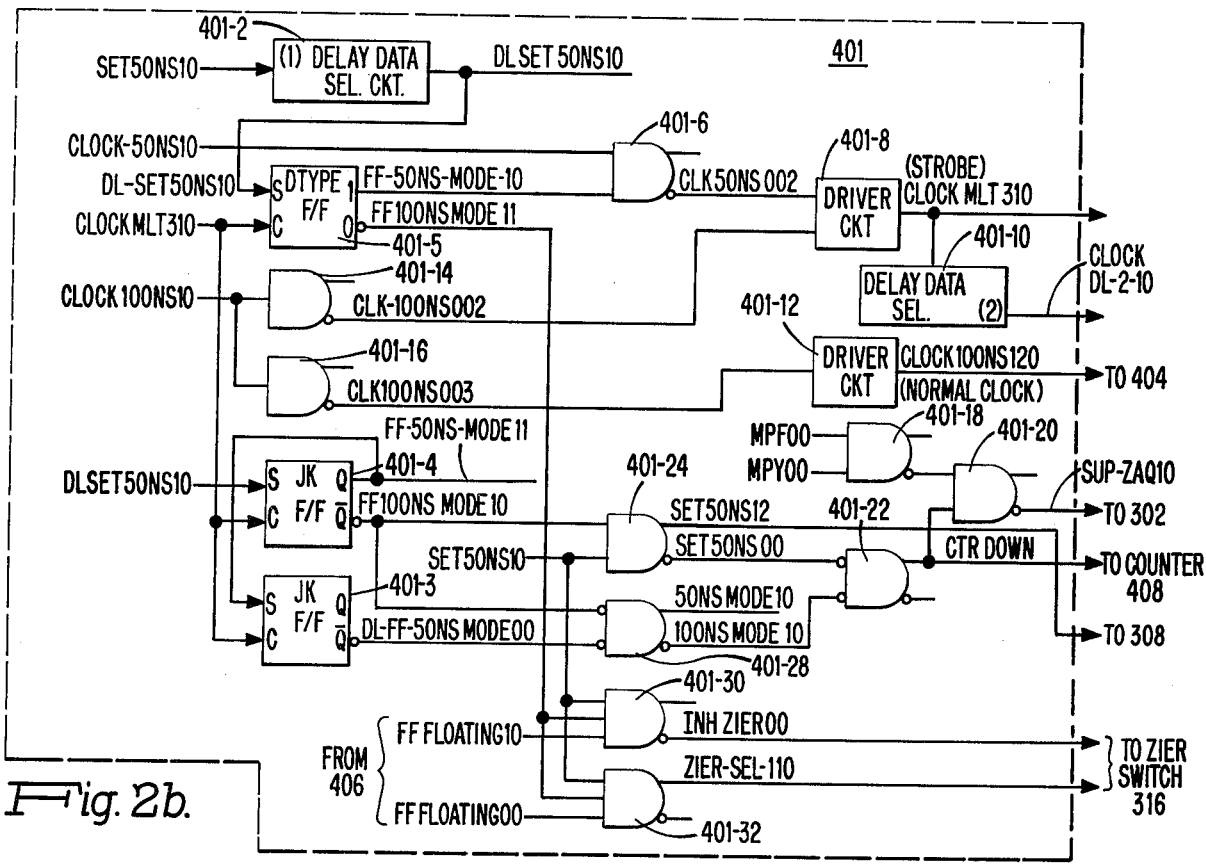
FIG. 2b shows in greater detail, the clock control circuits 901 of FIG. 1.

Referring first to FIG. 2b, it is seen that block 401 includes a number of AND/NAND gates 401-6, 401-14 through 401-32, a plurality of flip-flops 401-3 through 401-5, a pair of driver circuits 401-8 and 401-12, and a pair of delay circuits 401-2 and 401-10. All of the circuits may be considered conventional in design and may take the form of those circuits described in the publication "The Integrated Circuits Catalog", by Texas Instruments, Inc., dated 1972. The delay circuits are constructed using multiplexer or data selector circuits in order to provide accurate delays. Circuits of this type are also described in the referenced publication.

In operation, whenever the SET50NS10 a signal is a binary ONE, this causes the mode flip-flops 401-5 and 401-4 to switch to a binary ONE which forces signals FF50NS-MODE 10 and FF50NS-MODE 11 to a binary ONE. This specifies 50 nanosecond mode of operation in which clock pulses are delivered at a 50 nanosecond rate. As long as the clock bit 94 is a binary ONE, the system will remain in the 50 second nanosecond mode.

The mode flip-flop 401-4 when switched to a binary ONE forces another mode flip-flop 401-3 to a binary ONE forcing signal DL-FF-50NS-MODE 00 to a binary ZERO. This flip-flop maintains the multiply system in the 50 nanosecond mode throughout the last 100 nanosecond cycle prior to switching out of the 50 nanosecond mode of operation. At the end of the 100 nanosecond interval, flip-flop 401-3 is reset to a binary ZERO.

The binary ZERO side of mode flip-flop 401-5 is applied to the pair of gates 401-30 and 401-32 which control the operation of a multiplier selection switch 316 (ZIER). The gate 401-30 forces the output of the ZIER switch to ZEROS in the 100 nanosecond cycle before entering the 50 nanosecond mode in the case of floating point instructions (i.e., signal FFFLOATING10 = 1).

It will be noted that the outputs of the two flip-flops are "ored" together by gate 401-28 whose outputs then indicate whether the system is operating in 50 or 100 nanosecond mode. The state of the 100NSMODE 10 signal is used to control the operation of the counter 408 via gate 401-22 and the strobing of signals applied to the gates 304 via gate 401-20 when enabled by gate 401-18. The gate 401-24 generates the signal SET50NS12 in response to signals FF100NSMODE 10 and SET50NS10 which identify the last 100ns cycle before the system enters the 50ns mode. The SET50NS12 signal controls the loading of the RMN register 308.

Figure 3:
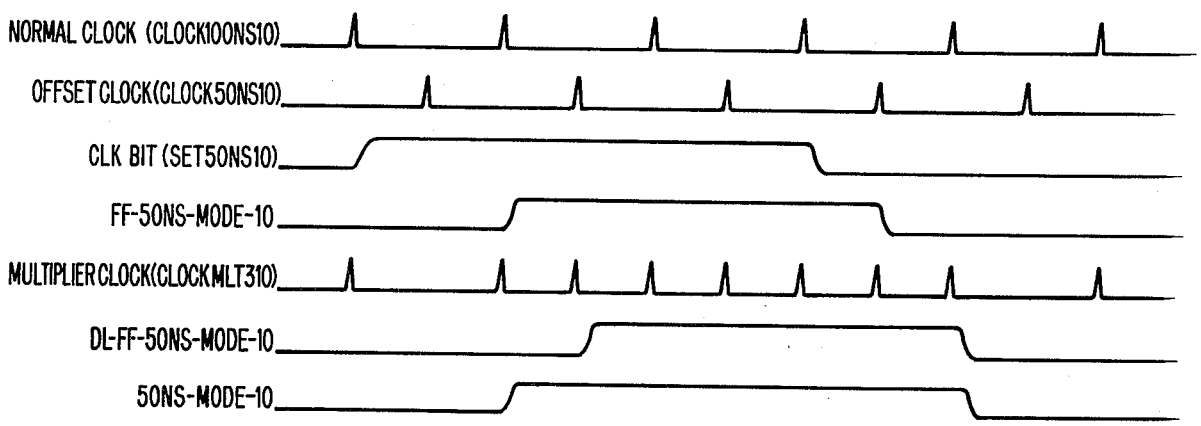
FIG. 3 shows several of the timing signals produced by the clock control circuits of FIG. 1.

The gate 401-6 when enabled by mode flip-flop 401-5 applies the set of clock pulses to the driver circuit 401-8. The driver circuit 401-8 also receives the second set of pulses from gate 401-14. The pulses applied from both inputs are "ored" by the driver circuit 401-8 to produce the clock signal CLOCK MLT310. This signal is delayed by selector circuit 401-10 to produce a delayed clock signal CLOCK DL-2-10. As seen from FIG. 1, the CLOCK MLT310 signal is applied to the flip-flops, RS and RC registers 250-4 and 250-6 in addition to the multiplier selection registers. To avoid any transfer race conditions, the signal CLOCK DL-2-10 is applied to the multiple generator latch circuits. The normal clock signal CLOCK 100NS120 is provided by the driver circuit 401-12 in response to the input signal CLOCK 100NS10 which is inverted by gate 401-16. The CLOCK100NS120 signal is applied to register 404 and strobes the register at 100 nanosecond intervals which corresponds to the read cycle of the ROM40. The various clock signals discussed above are illustrated in FIG. 3.

FIG. 2a shows in greater detail the decoder and encoder circuits of block 406. The octal decoder circuit 406-1 decodes bits 91-93 of the microinstruction word stored in the control point register 404 and generates signals indicating the type of multiply instruction. From the floating point signals produced by circuit 406-1, circuit 406-3 encodes these signals to define further the type of floating point operation such as normalized, unnormalized, etc. For the purpose of the present invention, the decoder and encoder circuits may be considered conventional in design. They may, for example, take the form of the circuits included in the aforementioned Texas Instruments, Inc., publication.

As mentioned above, it will be noted that the signals from the block 406 are used to control the selection of the 50 nanosecond mode of operation and the selection of multiplier bits. The counter 408 in response to signals from block 406 controls the selection of multiplier bits through the ZMR switch 310 of input section 300. The counter 408 is initially loaded with a starting count as a function of bits 91 through 93 and is decremented by one during each cycle when the system is operating in the 50 nanosecond mode (or when the SET50NS10 signal is a binary ONE).

As explained herein, initially, the three most significant bits of the counter are set to binary ONES and the least significant bit is set to a binary ONE for floating point instructions and to a ZERO for other instructions. The loading of counter 408 takes place during the cycle when the RCA register 302 is being loaded with the multiplicand. The output signals from the counter 408 are decoded by the circuits 410 and the resulting signals are used to select one of the eight positions of switch 310. The switch 310 feeds switch 312. The basic control depends upon whether the system is executing a floating point instruction. In the case of no floating point instruction, the output from switch 312 corresponds to the first position (ZMR0-6) and in the case of a floating point instruction the output is from the second position (ZMR2-8). The selection of switches and counter states are as illustrated in the table herein.

| INSTRN. | MLTPLR BITS | -MULTIPLIER BIT SELECTION ACTIONS- | COUNTER STATE | ZMR SWTCH CNTRL STATE | ZZMR SWTCH CNTRL STATE | ZIER SWTCH CNTRL STATE |
|---|---|---|---|---|---|---|
| MPF | 30-35,X | ZIER←RCH30-35, RMN0; RMN←RCH0-8; RMR-RCH24-30 | 1110 | 6 | 0 | 1 |
| MPY | 24-30 | ZIER←RMR; RMR←RCH18-24 | 1101 | 5 | 0 | 0 |
|  | 18-24 | ZIER←RMR; RMR←RCH12-18 | 1100 | 4 | 0 | 0 |
|  | 12-18 | ZIER←RMR; RMR←RCH6-12 | 1011 | 3 | 0 | 0 |
|  | 6-12 | ZIER←RMR; RMR←RMN0-6 | 1010 | 2 | 0 | 0 |
|  | 0-6 | ZIER←RMR | 1001 | 1 | 0 | 0 |
| FMP | XXXXXXX | Turn Off ZIER Enable; RMN←RCH0-8; RMR←RCH32-35, 000 | 1111 | 7 | 1 | * |
| UFM | 32-35,XXX | ZIER←RMR; RMR←RCH26-32 | 1110 | 6 | 1 | 0 |
|  | 26-32 | ZIER←RMR; RMR←RCH20-26 | 1101 | 5 | 1 | 0 |
|  | 20-26 | ZIER←RMR; RMR←RCH14-20 | 1100 | 4 | 1 | 0 |
|  | 14-20 | ZIER←RMR; RMR←RCH8-14 | 1011 | 3 | 1 | 0 |
|  | 8-14 | ZIER←RMR | 1010 | 2 | 1 | 0 |
| DFMP | XXXXXXX | Turn Off ZIER Enable; RMN←RCH0-8; RMR←RCH30-32, 000 | 1111 | 7 | 1 | * |
| DUFM | 68-71,XXX | ZIER←RMR; RMR←RCH26-32 | 1110 | 6 | 1 | 0 |
|  | 62-68 | ZIER←RMR; RMR←RCH20-26 | 1101 | 5 | 1 | 0 |
|  | 56-62 | ZIER←RMR; RMR←RCH14-20 | 1100 | 4 | 1 | 0 |

-continued

| INSTRN. | MLTPLR BITS | -MULTIPLIER BIT SELECTION ACTIONS- | COUNTER STATE | ZMR SWTCH CNTRL STATE | ZZMR SWTCH CNTRL STATE | ZIER SWTCH CNTRL STATE |
|---|---|---|---|---|---|---|
| | 50–56 | ZIER←RMR; RMR←RCH8–14 | 1011 | 3 | 1 | 0 |
| | 44–50 | ZIER←RMR; RMR←RMN2–8 | 1010 | 2 | 1 | 0 |
| | 38–44 | ZIER←RMR; RMR←RCH32–35, RMN0–2 | 1001 | 1 | 1 | 0 |
| | 32–38 | ZIER←RMR; RMR←RCH26–32 | 1000· | 0 | 1 | 0 |
| | 26–32 | ZIER←RMR; RMR←RCH20–26 | 0111 | 5 | 1 | 0 |
| | 20–26 | ZIER←RMR; RMR←RCH14–20 | 0110 | 4 | 1 | 0 |
| | 14–20 | ZIER←RMR; RMR←RCH8–14 | 0101 | 3 | 1 | 0 |
| | 8–14 | ZIER←RMR | 0100 | 0 | 1 | 0 |

MULTIPLE SELECTION TABLE
NOTE:
X is always a ZERO.
The RMN register is always initialized to ZEROS prior to the beginning of the multiplier bit selection process.
*The enable control to the switch is turned off during this cycle which forces the ZIER output to ZEROS.

Input Section 300

This section includes gate and register circuits 301, 302, 304, and 306 which receive signals representative of the multiplicand and multiplier, a pair of registers 308 and 314, delay circuits 320, in addition to the circuits 310, 312, and 316 which select the different bits of the multiplier in the proper sequence. The sequences and multiplier bit groupings for the different instructions are also indicated in the above table. The circuits of the section adapt the multiplier system to a 36 bit wide bus. It will be obvious that this section would be considerably less complex if the system were connected to a 72 bit wide bus.

The RMN register 308 is a 9 bit register which is cleared to ZERO whenever the RCA register 302 is loaded (i.e., when bits 91–93 specify such loading). Whenever the SET50NS12 signal is a binary ONE, register 308 is loaded with bits 0–8 from a register RCH, not shown. This confines loading to the last full 100 nanosecond cycle before the system begins operating in the 50 nanosecond mode. In the case of double precision multipliers, the RMN register 308 provides a smooth transition in transfers of the lower and upper words of the multiplier.

The RCA register 302 is a 36 bit register which provides storage for one word of the multiplier. As shown in FIG. 1, its outputs are applied in parallel to each of the multiple generator circuits 100-2, 100-4, and 100-6 of section 100. The buffer gate circuits 304 in a similar fashion connect in parallel to the multiple generator circuits of section 100. In the case of a double precision (floating point instruction) operation, these circuits apply the least significant 36 bits of the multiplicand from an input ZAQ bus which are held there throughout the execution of the instruction. In the case of a single precision operation, the input buffers are disabled by signal SUPZAQ10 from block 401. This results in ZEROS bein applied to the circuits of section 100.

Considering the multiplier selection switches in greater detail, it is seen that the ZMR switch 310 is a 9 bit wide, one of eight data selector switch. Under the control of counter 408, the ZMR switch 310 performs the primary multiplier bit selection. The ZZMR switch 312 is a 7 bit wide one of two data selector switch which selects which set of the output multiplier bit signals (ZMRO-8) is loaded into the 7 bit wide RMR register 314. The ZIER switch 316 is a 7 bit wide one of two data selector switch which selects which multiplier bit signals are applied to the multiple generator circuits of section 100.

During initial examination of the multiplier, the ZIER switch 316 either selects the bits directly from the input RCH register when the multiply instruction specifies a fixed point operation or forces its output to ZEROS when the multiply instruction specifies a floating point operation. The initial examination always takes place during a full 100 nanosecond cycle. All other examinations of the multiplier take place during 50 nanosecond cycles during which time the ZIER switch 316 selects the RMR register.

During the 100 nanosecond cycle, there is enough time to select the multiplier bits from the RCH register and generate the multiple. The RMR register ensures that multiplier bit selection occurs in one cycle and multiple generation takes place in the next cycle.

During the initial examination, the least significant bit selected is from the input RMNO. This bit is chosen because it is ZERO for the fixed point multiply instructions and for the start of the first multiplier word of a quad precision multiply instruction. Also, it corresponds to the most significant bit from the previous word during the switch of multiplier words for the quad precision multiply instruction.

As explained herein, the multiply operation is arranged so that the last partial product summation in the carry save adder network occurs in the last half of the final 100 nanosecond cycle while the system is operating in the 50 nanosecond mode. This provides for a smooth transition back to 100 nanosecond mode. Thus, the last multiplier examination must taken place during the first half of that last 100 nanosecond cycle.

The number of 50 nanosecond cycles is chosen to be always even and the number of multiplier bit selection cycles is equal to the number of 50 nanosecond cycles minus one plus one for the selection of the first multiplier bit during the last 100 nanosecond cycle preceding the 50 nanosecond cycles. Thus, the number of multiplier bit selection cycles must also be even. While this is acceptable for the 36 bit multiplier used in the case of fixed point operations, the 28 and 64 bit multipliers used in the case of floating point operations require an odd number of cycles to complete the examination of the multiplier. The number of cycles is made even by forcing the first multiplier bits selected to be all ZEROS. The actual bits from the multiplier are then used starting with the next selection.

As seen from FIG. 1, the multiplier bits selected by the ZIER switch 316 are delayed by circuits included within block 320 and then applied in parallel to each of the multiple generator circuits of section 100. The delay circuits can be considered conventional in design. For example, the circuits may take the form of data selector circuits connected in series to provide the required amount of delay. The amount delay selected is such that strobing or loading of the latch circuits can take place following the strobing at the other registers. This ensures that signals being scanned and applied to the RC and RS registers 200-10 and 200-12 do not change during the time the registers 200-10 and 200-12 are being strobed or loaded. For this reason, the clock or strobing signal CLOCK DL210 applied to the latch circuits is also delayed.

Multiple Generator Section 100

This section includes the multiple generator circuits 100-2, 100-4, and 100-6 in addition to the carry generation and decode circuits of block 100-10. These circuits in response to the multiplier bits applied thereto control the generation of multiples of the multiplicand during the multiplication. As mentioned, each of the circuits 100-2, 100-4, and 100-6 receives as data inputs the multiplicand signals from the RCA register 302 and the ZAQ input bus signals from buffer gate circuits of block 304.

Figure 2C:
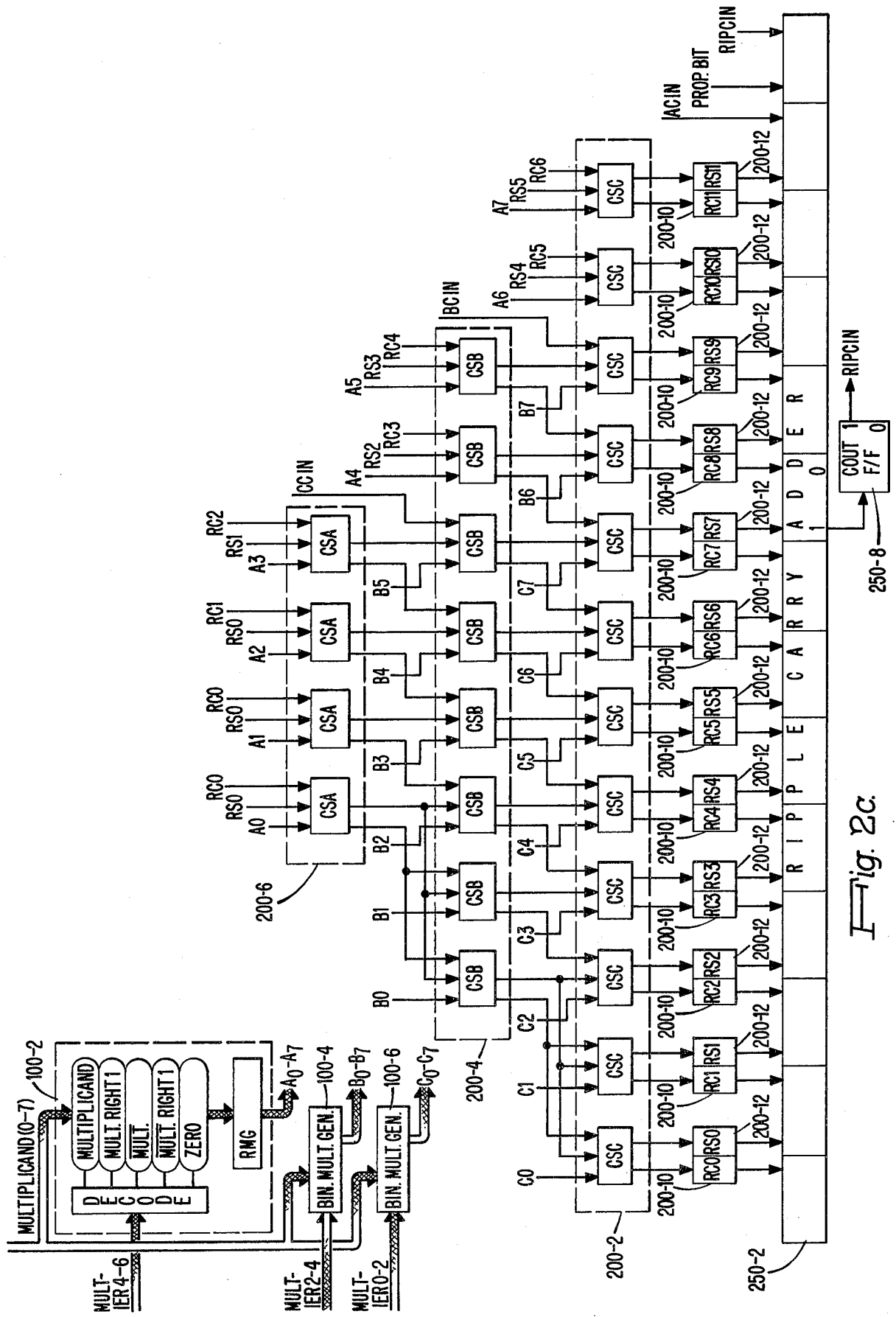
FIG. 2c shows in greater detail a simplified version of the carry save adder network 200 and binary multiple generator circuits 100 of FIG. 1.

Each of the multiple generator circuits employs the circuits disclosed in the patent applications of D. Fett and J. L. Kindell referenced as related applications. The function performed by such circuits is illustrated in FIG. 2c. Referring to the Figure, it is seen that the multiple generator circuit functions somewhat as a one of five data selector switch, the output of which feeds a number of latch circuits. The latch circuits enable the formation of the multiple and the summing of the multiple to the partial product to occur concurrently over an interval of two 50 nanosecond cycles. It will be noted that each generator circuit is 73 bits wide. This width allows the 72 bit multiplicands to be shifted right by one bit position without being truncated. The bit must be stored until it has been added to the partial product and until all carries resulting from the addition have been fully propagated. The shifting is denoted in FIG. 1 by the two ZEROS (i.e., 0,0). In the other positions, fixed values of ZERO and ONE are wired into positions so as to provide the appropriate values for the least significant bits of these multiples.

(two's complement) for a required subtraction operation.

The circuits of block 100-10 include decoder circuits, conventional in design, which decode the different groups of multiplier bits and generate the appropriate carry-out signals having the values indicated in the above table.

Additionally, the block 100-10 includes a plurality of flip-flops and delay circuits, conventional in design. The delay circuits which may also be constructed of data selector circuits, delay the carry-out signals generated by the decoder circuits. The signals are thereafter stored in clocked flip-flops whose binary ONE output are applied as inputs to the carry save adder section 200 and to the full adder section 250. The output signals correspond to signals DLFFCARRYA10, FFCARRYB10, and FFCARRYC10. The decoded signal DLFFCARRYA10 generated in response to the group of multiplier bits for the A level is applied to two series connected flip-flops before being applied to the section 250 in order to provide for proper timing as explained herein.

Carry Save Adder Section 200

This section includes a plurality of carry save adder array networks 200-2, 200-4, and 200-6 in addition to a carry register (RC) 200-10 and a sum register (RS) 200-12. The three levels, designated A, B, and C, of carry save adder array networks add the multiples to the partial product accumulated in the registers 200-10 and 200-12.

Figure 2D:
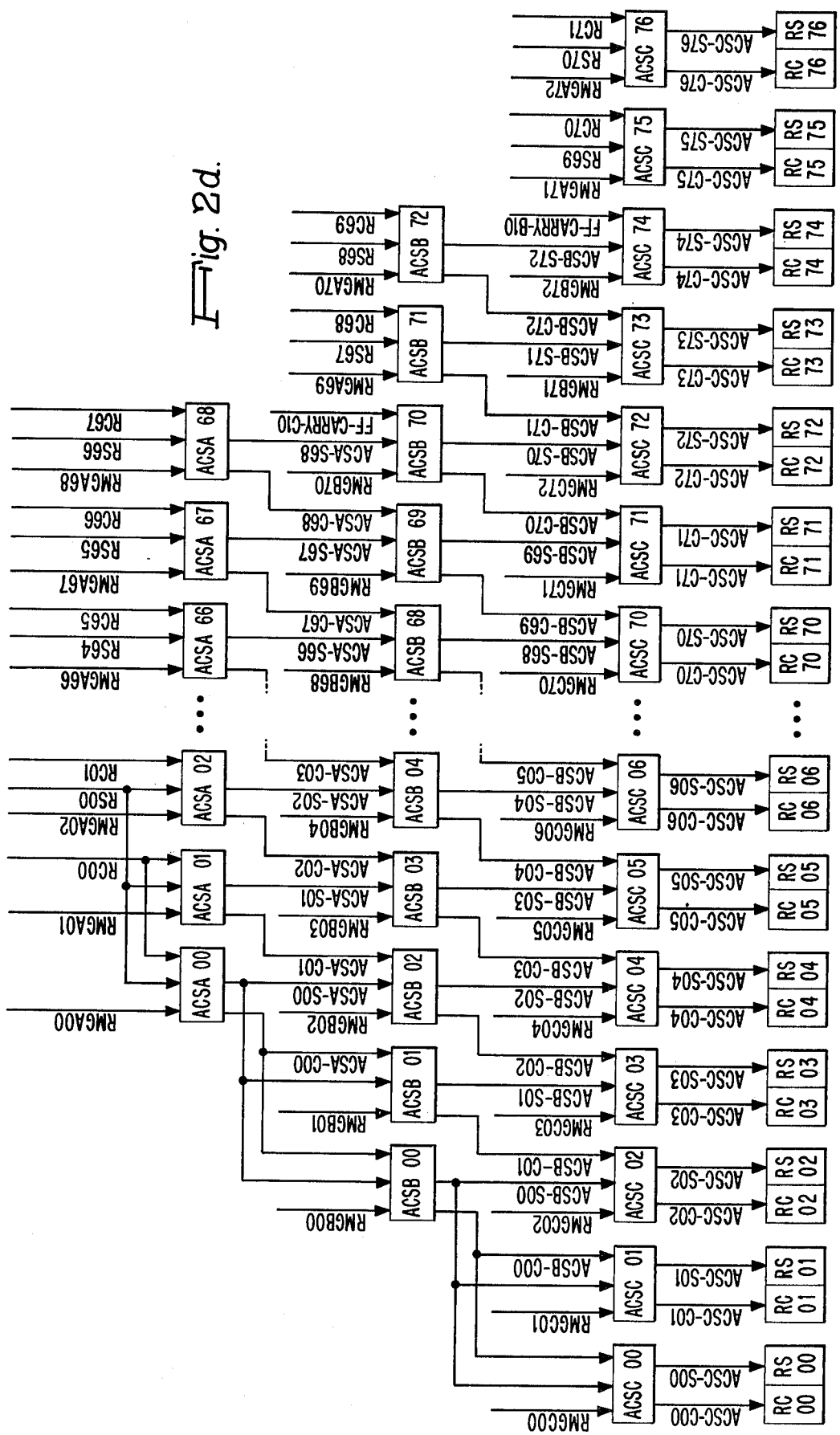
FIG. 2d shows the version of carry save adder network 200 of FIG. 1.

The different levels are shown in greater detail in FIGS. 2c and 2d. Referring to FIG. 2c, there are shown the connections to each of the carry save adder network levels for multiplying an 8 bit multiplicand by a 6 bit multiplier. It will be noted that the carry save adder networks broaden by two carry save adder circuit stages at both the most significant and least significant ends of each level. Thus, at each level, the multiple input signals are shifted left by 2 bit positions and at the bottom level, four carry save adder circuits do not re-

| ZIER SELECTED MULTIPLIER BITS | ZIER INPUT TO V114 CHIP | MULTIPLE FORMATION REQUIRED BY ALGORITHM | ACTION OF MULTIPLE GENERATOR | RESULT OF CARRY IN GENERATION |
|---|---|---|---|---|
| 000 | 111 | 0*M'icand | 0 | 0 |
| 001 | 110 | ½*M'icand | M'icand right one | 0 |
| 010 | 101 | ½*M'icand | M'icand right one | 0 |
| 011 | 100 | 1*M'icand | M'icand | 0 |
| 100 | 011 | −1*M'icand | M'icand | 1 |
| 101 | 010 | −½*M'icand | M'icand right one | 1 |
| 110 | 001 | −½*M'icand | M'icand right one | 1 |
| 111 | 000 | 0*M'icand | 0 | 0 |

From the table, it is seen that when a "negative" multiple is specified for generation, the multiple generator circuit produces the one's complement (inverse) of the multiple together with a carry-in bit provided by the circuits of block 100-10. When the complement of the multiple is added to the partial product by the carry-save network of section 200, the carry-in bit is also added to the least significant bit position of the multiple. This completes the complementing of the multiple ceive input signals from the multiple generator circuit 100-6. The widening at the most significant end positions the multiples at the proper bit positions which are to be added to the partial product. This accomplishes the 2 bit left shift of the multiplies.

Each of the blocks within each level (e.g., CSA, CSB, and CSC) represent a carry save adder circuit for performing the addition of a pair of addend bits and a carry bit. While this circuit could be considered conventional in design, in the preferred embodiment it takes the form of the carry save adder circuit disclosed in the patent application "Current Mode Carry Save Adder" invented by H. W. Miller. The ACin, BCin, and CCin signals correspond to the output carry-in signals generated by the carry-in generation circuits. The ACin signal instead of being applied to the carry save adder networks is stored in a flip-flop, not shown, and then applied to the carry adder of section 250 during a following cycle of operation.

The RC and RS registers 200-10 and 200-12 store the carry and sum output signals generated by the C level carry save adder network. The output signals from these registers, as shown, are applied as inputs to the A level carry save adder network and to the ripple carry adder of section 250.

FIG. 2d illustrates the structural arrangement of carry save adder array networks employed in FIG. 1. The left and right sides of the figure show the most significant bit structure and least significant bit structure, respectively. The middle part of the figure includes dash symbols indicating that the middle portion is just a repetition of the pattern illustrated wherein for a given carry save adder circuit n, the inputs correspond to a multiple circuit bit n at the same level as the adder circuit, a sum bit n-2 and a carry bit n-1 from the preceding level. It will be noted that the RC and RS registers 200-10 and 200-12 represent the preceding level for adder level A. The carry-in signals FFCARRYC and FFCARRYB produced by the carry generation and decode circuits of block 100-10 are inserted in levels in the places shown. The carry-in signal FFCARRYA is inserted into the ripple carry adder of section 250 at the stage which generates bit 76 as explained herein.

Full Adder Section 250

This section includes a 78 bit adder 250-2 with carry lookahead propagation in addition to carry out storage as illustrated in FIG. 2c (i.e., flip-flop 250-8). The adder 250-2 adds the carry signals to the sum signals of the partial product to form the final product. The adder stages may be considered conventional in design and in the preferred embodiment take the form of carry lookahead and adder circuits disclosed in the patent applications "Current Mode Carry Lookahead Array" inserted by H. W. Miller, and "Current Mode Arithmetic Logic Array" invented by H. W. Miller, previously referenced.

In operation, during the main multiply cycles, the adder 250-2 generates a carry out signal for bits of the product which are to be discarded during that cycle (i.e., bits 71-76). The carry out signal from bit position 71 is stored in a flip-flop, such as flip-flop 250-8 of FIG. 2c, and is applied as the carry input signal (i.e., RIPCIN in FIG. 2c) to the adder 250-2 during the next cycle.

As illustrated in FIG. 2c, the RS register 200-12 stages are connected to corresponding stages of the adder 250-2. The RC register 200-10 stages are in effect shifted one bit position to the left and then connected to stages of the adder 250-2. This leaves the input to the stage of bit position 76 or to position 12 of FIG. 2c free for the insertion of the carry-in signal from level A. The extra bit position in the adder 250-2 corresponds to the most significant bit position and serves as an extended sign bit. This stage always generates the actual sign and can be used in the detection and correction of overflow conditions. The input labeled "PROP BIT" in FIG. 2c is connected to a binary ONE enabling the carry out signal to be propagated through that stage. The stages in FIG. 1 are also similarly connected to binary ONES where such stages are absent a second input from the carry save adder circuits or other circuits associated therewith.

DESCRIPTION OF OPERATION

General

Before illustrating the operation of the system of the present invention, the overall operation of the system will be described in general terms with reference to FIG. 4 and a table included herein.

As mentioned, the operations performed by the various sections of the system are overlapped. The table included herein shows the major actions that occur in each cycle of operation during the execution of a typical instruction. The table only shows those cycles associated with the different sections in which actions take place which are related in producing the final product. However, it will be appreciated that all of the sections are always performing some action.

|   | MLTPLR BIT SELECTION | MLTPL GENERATION | CARRY SAVE ADDER ARRAY | CARRY PROPAGATE ADDER | DATA OUTPUT |
|---|---|---|---|---|---|
| T | MLTPLR→RCH 0→RMN | LOAD UPPER HALF M'ICAND IN RCA | 0→ RC, RS | | |
|   | 1st MLTPLR BITS→ZIER RCH0-8→RMN 2nd MLTPLR BITS→RMR | 1st MLTPLS TO RMG'S | | | |
| T/2 | RMR→ZIER MLTPLR→RMR | MULTIPLES→RMGs | RMGs + PARTL PROD →RC, RS | | |
|   | RMR→ZIER MLTPLR→RMR | MULTIPLES→RMGs | RMGs + PARTL PROD →RC, RS | RC + RS→AM AM CARRY BIT 71→FF | |
|   | RMR→ZIER MLTPLR→RMR | MULTIPLES→RMGs | RMGs + PARTL PROD →RC, RS | RC + RS→AM AM CARRY BIT 71→FF | |
|   | RMR→ZIER MLTPLR→RMR | MULTIPLES→RMGs | RMGs + PARTL PROD →RC, RS | RC + RS→AM AM CARRY BIT 71→FF | |
|   | RMR→ZIER | MULTIPLES→RMGs | RMGs + PARTL PROD →RC, RS | RC + RS→AM AM CARRY BIT 71→FF | |
|   | | | RMGs + PARTL PROD →RC, RS | RC + RS→AM AM CARRY BIT 71→FF | |
| T | | | | RC+RS →AM | AM LOWER →OUT- |

| MLTPLR BIT SELECTION | MLTPL GENERATION | CARRY SAVE ADDER ARRAY | CARRY PROPAGATE ADDER | DATA OUTPUT |
|---|---|---|---|---|
| | | | | PUT REGS |
| | | | RC+RS →AM | AM UPPER OUTPUT REGS |

Figure 4:
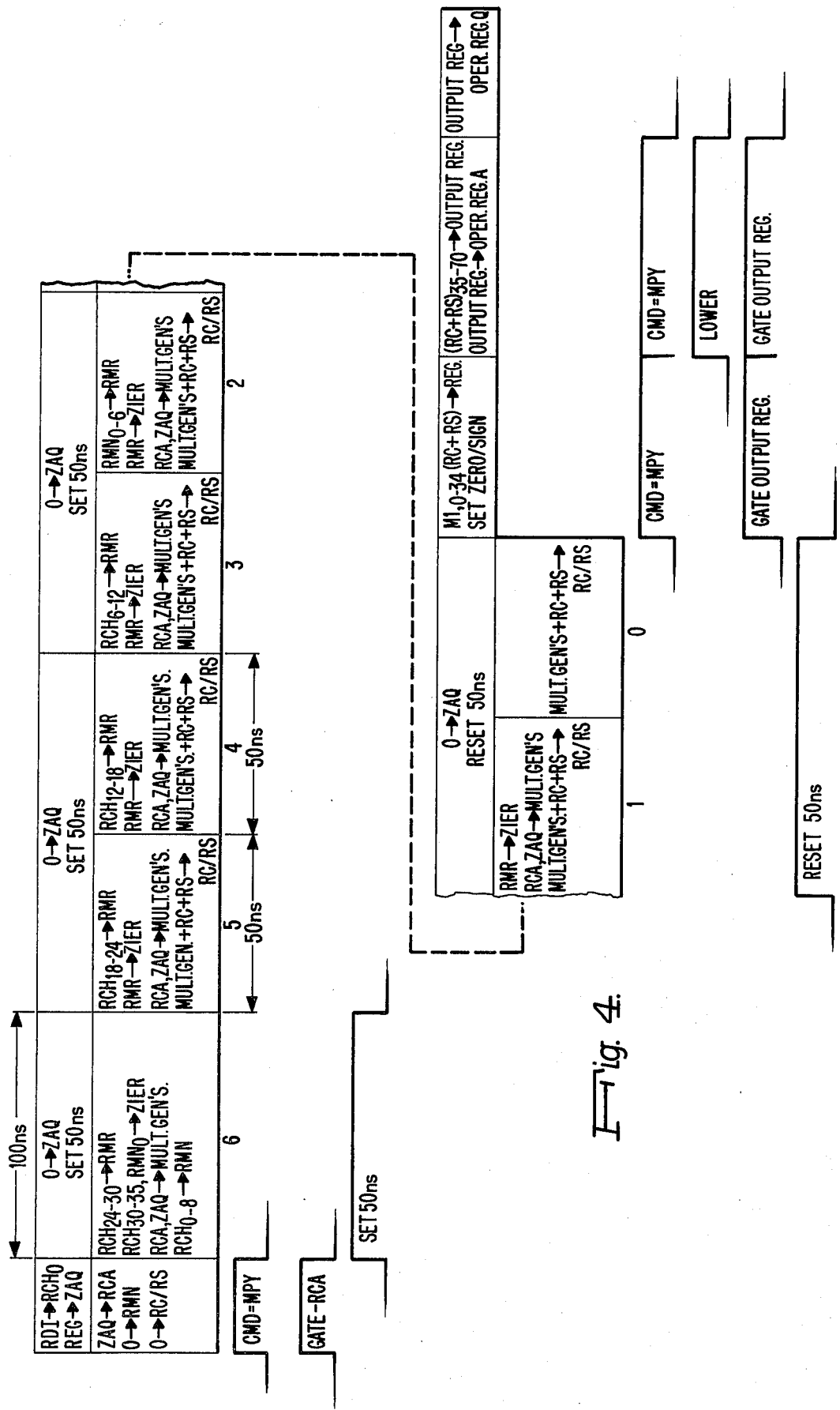
FIG. 4 illustrates a diagram used to explain the operation of the present invention.

FIG. 4 illustrates the actions for a fixed binary integer multiply (MPY) which involves a 36 bit multiplicand. Referring to the figure, it will be noted that the first cycle is a set up cycle. During this cycle, the multiplier bit signals are loaded into a register where they can be examined and the multiplicand is loaded into the RCA register. In this instance, ZEROS are being loaded into the RMN, RC, and RS registers during the same cycle.

During the second cycle, the system receives the second half of the multiplicand from the ZAQ bus. Since the second half of the multiplicand for this type instruction is always ZERO, the input bus is forced to ZEROS. At this time, the system is set to the 50 nanosecond mode of operation at the start of the next 100 nanosecond cycle by the circuits of block 401. Also, the counter 408 will also have been forced to state "1110".

It will be noted that during this cycle, the input section 300 examines the first 7 bits of the multiplier which causes the first multiple generated by each of the multiple generator circuits 100-2, 100-4, and 100-6 to be loaded into the latch circuits associated therewith. That is, the ZIER switch 316 distributes the different groups of multiplier bits to each of the generator circuits which in turn select the proper multiplier to be stored by the latch circuits. At the same time, a second set of multiplier bits is selected and loaded into the RMR register 314. Also, the upper bits are loaded into the RMN register 308.

As seen from FIG. 4, the system begins a series of four 50 nanosecond cycles which repetitively perform the same actions. During each cycle, a next group of multiplier bits is selected and loaded into the RMR register 316. In parallel, the multiplier bits previously stored in the RMR register 316 select the next group of multiples which is stored in the latch circuits. The multiples previously stored in the latch circuits are added by the carry save adder networks 200-2, 200-4, and 200-6 to the RC and RS registers 200-10 and 200-12 with the result being then stored in the RC and RS registers 200-10 and 200-12. It will be appreciated that the counter 408 is decremented by the circuits of block 401 during each cycle.

After the operations outlined above are performed, the loading of the multiplier bits is complete. During the next cycle, the multiplier bits previously stored in the RMR register 316 select the last group of multiples. The multiple generator circuits generate the multiples which are stored in the latch circuits associated therewith while the carry save adder networks sum the multiples previously stored in the latch circuits. During a final cycle of execution, the carry save adder networks sum the multiples stored in the latch circuits as shown in FIG. 4. At this point, the carry and sum registers 200-10 and 200-12 store the complete product. Also, during this cycle, the system is conditioned to be switched back into the 100 nanosecond mode of operation by the circuits of block 401.

The next two cycles serve as "clean up" cycles during which the full adder 250-2 adds the contents of the RC and RS registers 200-10 and 200-12. Also, during these cycles, indicators (i.e., ZERO and sign) are examined and signals representative of the final product are transferred to various registers located in other units for storage.

It will be appreciated that there are slight variations in the cycles as well as in the set up operations for the different instructions. For example, as mentioned previously, in the case of a floating point multiply instruction, during the initial 100 nanosecond cycle, the input signals are forced to ZEROS in order to have the number of 50 nanosecond cycles come out even. This ensures that the last half cycle occurs in synchronism with the end of a 100 nanosecond cycle interval. That is, the multiplication begins on a full or half cycle depending upon whether the multiplier is divisible by six.

DETAILED DESCRIPTION OF OPERATION

The operation of the multiplication system of the present invention will now be described with reference to a specific example. The example is a multiply fractional instruction (MPF) in which the multiplier, multiplicand, and final product have the following values.

| Multiplier | = 0.101 1000 1110 1100 0000...0000 | Binary |
| | = 0.543540000000 | Octal |
| | = 0.6947021484375 | Decimal |
| Multiplicand | = 0.111 0000 0000...0000 | Binary |
| | = 0.7 | Octal |
| | = 0.875 | Decimal |
| Product | = 0.100 1101 1100 1110 1000...0 | Binary |
| | = 0.467164 | Octal |
| | = 0.6078643798828125 | Decimal |

The values for the multiplier have been selected so that each of the eight possible combinations of multiplier bits is included. The multiplicant for ease of illustration was chosen to be all ZEROS except for one digit. The equivalent octal and decimal values are also given to facilitate noting of the results generated during each cycle of operation. The contents of the registers have octal values indicated during the cycle. The values are also given in binary form in those instances where it facilitates an understanding of the system's operation.

The first cycle is a start execution cycle. During this cycle, the multiplier applied initially from a data-in register, not shown, is applied via a temporary storage register, RCH, now shown, to the lines RCHO-35. Also, the multiplicand is transferred from an operand register, not shown, to the RCA register 302. In the example, they have the following values.

Multiplier = 0.543540000000
Multiplicand = 0.700000000000

The contents of other registers, e.g., RCH, RMN, RCA, RC, RS, RMR, and latch circuits RMGA, RMGB, and RMGC can store any values since they are not relevant (i.e., represent "don't care" situations).

During the second cycle, the first set of multiples is prepared and the multiplier bits examined by the ZIER switch 316 correspond to RCH bits 30–35 and RMN bit 0. In this case, all seven multiplier bits are ZEROS. Therefore, the decoder circuit of each multiple generator circuit selects ZEROS for all three levels and the ZEROS are stored in each of the latch circuits RMGA, RMGB, and RMGC. Also, the RCH bits 24–30 are selected by ZMR switch 310 and loaded into the RMR register 314 via the ZZMR switch 312. The RCH bits 0–8 are loaded into the RMN register 308 in response to the SET50NS12 signal. The SET50NS12 signal also conditions the circuits of block 40 to switch into 50 nanosecond mode of operation during the next cycle.

During the second cycle, the pertinent registers and circuits store and generate signals having the following values:

| | | | |
|---|---|---|---|
| RCHO | = | 0.5435400000000 | |
| RCA | = | 0.7000000000000 | |
| ZAQ | = | 0.0000000000000 | |
| RMN | = | 000 | |
| RC | = | 0.0 | ... 0 |
| RS | = | 0.0 | ... 0 |
| ZIER | = | 000 | |
| CARRYA | = | 0 | |
| CARRYB | = | 0 | |
| CARRYC | = | 0 | |

During this cycle (i.e., first 50 nanosecond cycle), the multiples prepared in the preceding cycle are added together by the carry save adder networks to form a ZERO partial product represented by the contents of the carry and sum registers. That is, since all the input multiple signals are ZEROS, all adder sum and carry output signals generated are ZEROS. The multiplier bits stored in the RMR register 314 are ZEROS, therefore, the multiples being prepared during this cycle are ZEROS. In addition, the carry output signals are ZEROS. The multiplier signals RCH 18–24 are selected and placed in the RMR register 314.

During this cycle (i.e., first 50 nanosecond cycle), the pertinent registers and circuits store and generate signals having the following values.

| | | | |
|---|---|---|---|
| RCHO | = 0.543540000000 | | |
| RCA | = 0.70 | ... 0 | |
| ZAQ | = 0.0 | ... 0 | |
| RMN | = 261 | | |
| RMGA | = 0.0 | ... 0 | |
| RMGB | = 0.0 | ... 0 | |
| RMGC | = 0.0 | ... 0 | |
| RC | = 0.0 | ... 0 | |
| RS | = 0.0 | ... 0 | |
| ACSA CARRY | = 0.0 | ... 0 | |
| ACSA SUM | = 0.0 | ... 0 | |
| ACSB CARRY | = 0.0 | ... 0 | |
| ACSB SUM | = 0.0 | ... 0 | |
| ACSC CARRY | = 0.0 | ... 0 | |
| ACSC SUM | = 0.0 | ... 0 | |
| FF-CARRY A 10 | = 0 | | |
| FF-CARRY B 10 | = 0 | | |
| FF-CARRY C 10 | = 0 | | |
| RMR | = 000 | | |
| ZIER | = 000 | | |
| CARRY A | = 0 | | |
| CARRY B | = 0 | | |
| CARRY C | = 0 | | |

During the next cycle (i.e., second 50 nanosecond cycle), the pertinent registers and circuits store and generate signals having the following values.

| | | | |
|---|---|---|---|
| RCHO | = 0.543540000000 | | |
| RCA | = 0.70 | ... 0 | |
| ZAQ | = 0.0 | ... 0 | |
| RMN | = 261 | | |
| RMGA | = 0.0 | ... 0 | |
| RMGB | = 0.0 | ... 0 | |
| RMGC | = 0.0 | ... 0 | |
| RC | = 0.0 | ... 0 | |
| RS | = 0.0 | ... 0 | |
| ACSA CARRY | = 0.0 | ... 0 | |
| ACSA SUM | = 0.0 | ... 0 | |
| ACSB CARRY | = 0.0 | ... 0 | |
| ACSB SUM | = 0.0 | ... 0 | |
| ACSC CARRY | = 0.0 | ... 0 | |
| ACSC SUM | = 0.0 | ... 0 | |
| FF-CARRY A 10 | = 0 | | |
| FF-CARRY B 10 | = 0 | | |
| FF-CARRY C 10 | = 0 | | |
| RMR | = 000 | | |
| ZIER | = 000 | | |
| CARRY A | = 0 | | |
| CARRY B | = 0 | | |
| CARRY C | = 0 | | |
| DL-FF-CARRY A 10 | = 0 | | |
| FULL ADDER (AM) | = 0.0 | ... 0 | |
| ADDER CARRY OUT BIT71 | = 0 | | |

It will be noted that, again, multiples having a ZERO value are added by the carry save adder networks producing a ZERO partial product corresponding to the sum and carry component signals stored in the RS and RC registers 200-12 and 200-10. Also, new ZERO multiples are generated by the multiple generator circuits since the multiplier bits stored in the RMR register 314 are ZEROS. Multiplier bits RCH 12–18 are selected and stored in the RMR register 314. The full carry adder 250-2 sums the contents of RC and RS registers which produces a ZERO carry out signal for the product bits which will be discarded (not required for the final result).

During the next cycle of operation (i.e., third 50 nanosecond cycle), the carry save adder networks again sum the ZERO multiples stored in the latch circuits to a ZERO partial product resulting in a ZERO partial product. The full carry adder also produces a ZERO final product result. However, during this cycle, the multiplier bits stored with RMR register 314 are not all ZEROS but have the binary value "1100000". This means that the groups of multiplier bits for the A, B, and C levels are "000", "000", and "110", respectively. Therefore, the multiple generator circuits 100-2 and 100-4 generate ZERO multiples while the multiple generator circuits 100-6 generates a multiple having a value −½ times the multiplicand. The RMGC multiple generator circuit generates the multiple by shifting the input multiplicand signals one bit position to the right and then complementing or inverting each bit signal. The carry output signal is also a binary ONE to complete the subtraction operation by 2's complement addition. Lastly, the bits RCH 6–12 are selected and stored in the RMR register 314.

Thus, during this cycle, the pertinent registers and circuits store and generate signals having the following values.

| | | | |
|---|---|---|---|
| RCHO | = 0.543540000000 | | |
| RCA | = 0.70 | ... 0 | |
| ZAQ | = 0.0 | ... 0 | |
| RMN | = 261 | | |
| RMGA | = 0.0 | ... 0 | |
| RMGB | = 0.0 | ... 0 | |

-continued

| | | |
|---|---|---|
| RMGC | = 0.0 | ... 0 |
| RC | = 0.0 | ... 0 |
| RS | = 0.0 | ... 0 |
| ACSA CARRY | = 0.0 | ... 0 |
| ACSA SUM | = 0.0 | ... 0 |
| ACSB CARRY | = 0.0 | ... 0 |
| ACSB SUM | = 0.0 | ... 0 |
| ACSC CARRY | = 0.0 | ... 0 |
| ACSC SUM | = 0.0 | ... 0 |
| FF-CARRY A 10 | = 0 | |
| FF-CARRY B 10 | = 0 | |
| FF-CARRY C 10 | = 0 | |
| RMR | = 140 | |
| ZIER | = 140 | |
| CARRY A | = 0 | |
| CARRY B | = 0 | |
| CARRY C | = 1 | |
| DL-FF-CARRY A 10 | = 0 | |
| FULL ADDER (AM) | = 0.0 | ... 0 |
| ADDER CARRY OUT BIT71 | = 0 | |
| ADDER F-CARRY-IN BIT76 | = 0 | |

The octal 1 in the RMR register 314 corresponds to the value of the least significant bit position of the next number in binary (i.e., 5).

During this cycle (i.e., the fourth 50 nanosecond cycle), the pertinent registers and circuits store and generate signals having the following values.

| | | |
|---|---|---|
| RCHO | = 0.543540000000 | |
| RCA | = 0.70 | ... 0 |
| ZAQ | = 0.0 | ... 0 |
| RMN | = 261 | |
| RMGA | = 0.0 | ... 0 |
| RMGB | = 0.0 | ... 0 |
| RMGC | = 1.437 | ... 7 |
| RC | = 0.0 | ... 0 |
| RS | = 0.0 | ... 0 |
| ACSA CARRY | = 0.0 | ... 0 |
| ACSA SUM | = 0.0 | ... 0 |
| ACSB CARRY | = 0.0 | ... 0 |
| ACSB SUM | = 0.0 | ... 04 |
| ACSC CARRY | = 0.0 | ... 0100 |
| ACSC SUM | = 1.437 | ... 7600 |
| FF-CARRY A 10 | = 0 | |
| FF-CARRY B 10 | = 0 | |
| FF-CARRY C 10 | = 1 | |
| RMR | = 035 | |
| ZIER | = 035 | |
| CARRY A | = 1 | |
| CARRY B | = 0 | |
| CARRY C | = 0 | |
| DL-FF-CARRY A 10 | = 0 | |
| FULL ADDER (AM) | = 0.0 | ... 0 |
| ADDER CARRY OUT BIT71 | = 0 | |
| ADDER F-CARRY-IN BIT76 | = 0 | |

It will be noted that during this cycle, the carry save adder networks add the first non-ZERO multiple to the partial product. Since signals from the RC and RS registers 200–10 and 200–12 and the RMGA latch circuits are ZEROS, the sum and carry output signals from the ACSA carry save adder network are ZEROS. The stored C level carry output signal FFCARRYC is inserted into the B level carry save adder network at position ACSB-70. This, in turn, causes the ACSB carry save adder network to produce a non-ZERO sum as indicated above (i.e., since all signals are shifted two bit positions to the left, the sum = 4).

The multiple signals from the latch circuits of multiple generator circuit RMGC are summed to the partial product by the carry save adder network ACSC which gives the result indicated. During this cycle, the full adder 250-2 still is summing ZEROS.

During this cycle, the multiplier bits in the RMR register 314 have the binary value "0011101". The multiplier bit groups for levels A, B, and C are "101", "111", and "001", respectively. Thus, the multiple generator circuit 100-2 generates a −½ times the multiplicand for addition to the partial product. Accordingly, the multiplicand signals to the multiple generator circuit 100-2 are shifted right by one, inverted, and stored in the RMGA latch circuits. Also, the carry output signal is forced to a binary ONE and stored. The multiplier signals "111" cause the multiple generator circuit 100-4 to generate a ZERO multiple. Thus, the multiple generator circuit causes ZEROS to be loaded into the RMGB latch circuits and a ZERO the carry output signal to be generated and stored.

The "001" multiplier signals cause the multiple generator circuit 100-6 to generate a +½ times the multiplicand. Accordingly, the circuit 100-6 shifts the input multiplicand signals right by one and loads them into the RMGC latch circuits for later addition to the partial product. A binary ZERO carry output signal is generated and stored. Lastly, bits RMN0-6 are selected and stored in the RMR register 314.

During the next cycle, (i.e., the fifth 50 nanosecond cycle), the pertinent registers and circuits store and generate signals having the following values.

| | | |
|---|---|---|
| RCHO | = 0.543540000000 | |
| RCA | = 0.70 | ... 0 |
| ZAQ | = 0.0 | ... 0 |
| RMN | = 261 | |
| RMGA | = 1.437 | ... 7 |
| RMGB | = 0.0 | ... 0 |
| RMGC | = 0.340 | ... 0 |
| RC | = 0.0 | ... 0100 |
| RS | = 1.437 | ... 7600 |
| ACSA CARRY | = 1.407 | ... 76 |
| ACSA SUM | = 0.330 | ... 0 |
| ACSB CARRY | = 0.0020 | ... 03 |
| ACSB SUM | = 1.6657 | ... 74 |
| ACSC CARRY | = 0.3410 | ... 0114 |
| ACSC SUM | = 1.41437 | ... 7654 |
| FF-CARRY A 10 | = 1 | |
| FF-CARRY B 10 | = 0 | |
| FF-CARRY C 10 | = 0 | |
| RMR | = 054 | |
| ZIER | = 054 | |
| CARRY A | = 1 | |
| CARRY B | = 0 | |
| CARRY C | = 0 | |
| DL-FF-CARRY A 10 | = 0 | |
| FULL ADDER (AM) | = 3.440 | ... 0 |
| ADDER CARRY OUT BIT71 | = 1 | |
| ADDER F-CARRY-IN BIT76 | = 0 | |

The multiplier bits stored in the RMR register 314 have the binary value "0101100". This means that the multiplier bit groups for levels A, B, and C are "100", "011", and "010", respectively. Thus, the multiple generator circuit 100-2 requires the generation of −1 times the multiplicand for addition to the partial product. Accordingly, the circuit 100-2 is operative to invert the multiplicand input signals and store them in the RMGA latch circuits. Also, the carry output signal for level A is forced to a binary ONE to complete the 2's complement addition. Since the multiplier bits for level B are "011", the multiple generator circuit 100-4 is required to generate 1 times the multiplicand. Accordingly, the circuit 100-4 is operative to stroe the input multiplicand signals in the RMGB latch circuits. Also, the carry output signal for level B remains a binary ZERO. The multiplier bits for level C are "010" which requires the multiple generator circuit 100-6 to generate +½ times the multiplicand. Accordingly, the circuit 100-6 shifts the input multiplicand signals right by one and loads them into the RMGC latch circuits. The carry output signal for level C is a binary ZERO. At this point, it will be noted that all of the multiplier bits have been examined.

During this cycle, the carry save adder networks sum the previously stored multiples in each of the RMGA, RMGB, and RMGC latch circuits to the partial product in the manner previously described. During each cycle, the adder 250-10 and 200-12 and the carry signal produced from bit position (i.e., 76) during the next cycle. This takes into account any effect the discarded bits will have on the final product.

During the next cycle (i.e., sixth 50 nanosecond cycle), the carry save adder networks sum the multiples stored in the atch circuits RMGA, RMGB, and RMGC to the partial product. The adder 250-2 generates the carry out signal. The pertinent registers and circuits store and generate signals having the following values.

| | | |
|---|---|---|
| RCHO | = 0.543540000000 | |
| RCA | = 0.70 | ...0 |
| ZAQ | = 0 | |
| RMN | = 261 | |
| RMGA | = 1.07 | ...7 |
| RMGB | = 0.70 | ...0 |
| RMGC | = 0.340 | ...0 |
| RC | = 0.3410 | ...0114 |
| RS | = 1.41437 | ...7654 |
| ACSA CARRY | = 1.16347 | ...76 |
| ACSA SUM | = 0.61430 | ...0 |
| ACSB CARRY | = 0.541020 | ...03 |
| ACSB SUM | = 1.232657 | ...710 |
| ACSC CARRY | = 0.240410 | ...014 |
| ACSC SUM | = 1.7661437 | ...740 |
| FF-CARRY A 10 | = 1 | |
| FF-CARRY B 10 | = 0 | |
| FF-CARRY C 10 | = 0 | |
| DL-FF-CARRY A 10 | = 1 | |

-continued

| | | |
|---|---|---|
| FULL ADDER (AM) | = 0.31640 | ...0114 |
| ADDER CARRY OUT BIT71 | = 1 | |
| ADDER F-CARRY-IN BIT76 | = 1 | |

This completes the series of 50 nanosecond cycles and the circuits of block 401 condition the system to switch back to 100 nanosecond mode during the start of the next cycle.

In this cycle, the pertinent registers and circuits have the following values.

| | | |
|---|---|---|
| RC | = 0.2404100 | ...014 |
| RS | = 1.7661437 | ...740 |
| DL-FF-CARRY A 10 | = 1 | |
| F-CARRY-7176 | = 1 | |
| FULL ADDER (AM) | = 0.4671640 | ...0 |

During this cycle, the contents of the RC register 200-10 shifted left one is added to the contents of the RS register 200-12 to form a final product in stages 0-71 of adder 250-2. The most significant bit position of the adder is used to signal overflow conditions. Since the formation of the final product is complete, the example can be viewed as complete. The additional "clean up" cycles discussed previously simply provide for storage of the final product in the appropriate registers and the setting of the indicators.

For completeness, the following table is included illustrating the states of the carry save adder networks and adder during the last four cycles.

CYCLE 6

| | | | |
|---|---|---|---|
| ACSA | RS Right 2→ <br> RC Right 1→ <br> RMGA | 000 ... <br> 000 ... <br> 000 ... | 000 <br> 000 <br> 000 |
| ACSB | ACSA SUM ←Left 1 <br> ACSA CARRY <br> RMGB | 00000 ... <br> 00000 ... <br> 00000 ... | 00000 <br> 00100 <br> 00000 |
| ACSC | ACSB SUM ←Left 1 <br> ACSB CARRY <br> RMGC | 0000000 ... <br> 0000000 ... <br> 1100011 ... | 0010000 <br> 0000000 <br> 1110000 |
| | ACSC SUM <br> ACSC CARRY | 1100011 ... <br> 0000000 ... | 1100000 <br> 0010000 |

CYCLE 7

| | | | |
|---|---|---|---|
| ACSA | RS Right 2→ <br> RC Right 1→ <br> RMGA | 111 100 011 111 <br> 000 000 000 000 <br> 110 001 111 111 | ...111 <br> ...000 <br> ...111 |
| ACSB | ACSA SUM <br> ACSA CARRY ←Left 1 <br> RMGA | 00001101100000 <br> 11100000111 <br> 00000000000 | ...00011 <br> ...11000 <br> ...00011 |
| ACSC | ACSB SUM <br> ACSB CARRY ←Left 1 <br> RMGC | 1111101101011111 <br> 0000000001000 <br> 0011100000000 | ...1100011 <br> ...0011011 <br> ...0000011 |
| | ACSC SUM <br> ACSC CARRY | 1100001100011111 <br> 0011100001000000 | ...1111011 <br> ...0000011 |
| AM | RS <br> RC ←Left 1 | 1110001111 <br> 0000000000 | ...11100000 <br> ...00100000 <br> 0 |
| | AM | 1110010 | ...00000 |

CYCLE 8

| | | | |
|---|---|---|---|
| ACSA | RS —Right 2→ | 111 100 001 100 011 111 | ...111 |
| | RC —Right 1→ | 000 111 000 010 000 | ...000 |
| | RMGA | 100 011 111 | ...111 |
| ACSB | ACSA SUM | 00011000110001100000 | ...00011 |
| | ACSA CARRY ←Left 1 | 11001110011100111 | ...11000 |
| | RMGB | 01110000 | ...00011 |
| ACSC | ACSB SUM | 1110100110101101011111 | ...100011 |
| | ACSB CARRY ←Left 1 | 001011000010001000 | ...011000 |
| | RMGC | 0011100000 | ...000011 |
| | ACSC SUM | 111111011000110001111 | ...111000 |
| | ACSC CARRY | 0010100000100001000 | ...000011 |
| AM | RS ←Left 1 | 1110000110001111 | ...1011 |
| | RC | 0011100001000 | ...0111 |
| | | | 1 |
| | AM | 0001100111010000 | ...0011 |

CYCLE 9

| | | | |
|---|---|---|---|
| AM | RS ←Left 1 | 111111101100011000111 | ...1000 |
| | RC | 0010100000100001000 | ...0111 |
| | | | 1 |
| | AM | 0010011011100111010000 | ...0000 |

From the foregoing, it is seen how the system of the present invention is able to perform multiplication operations at high speeds by employing a plurality of multiple generator circuits in combination with a corresponding number of carry save adder circuits. Under the control of timing circuits, the system generates groups of multiple signals in parallel while the carry save adder networks sum previously generated and stored multiple signals to the carry and sum components of a partial product, thereby reducing to a minimum the overall time required to execute a multiply instruction.

In the preferred embodiment, the system is organized so as to facilitate construction with current mode logic circuits. However, it will be obvious to those skilled in the art that many changes may be made to the system without departing from the teachings of the present invention. For example, modifications may be made to the input section for adapting the system to buses having different operating characteristics. Also, different types of controls may also be employed. Further, the system may be constructed with various types of logic circuits arranged to perform the functions indicated. Other modifications will be obvious to those skilled in the art.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift registers, etc., from his own background or from available standard references, such as "Arithmetic Operations in Digital Computers" by R. K. Richards, (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statute, there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A high speed multiplication system for performing a multiplication operation upon received signals corresponding to a multiplier and multiplicand, said system comprising:

a plurality of multiple generator means for producing different multiples of said multiplicand, each of said plurality of multiple generator means being connected to receive a different group of said signals of said multiplier and said signals of said multiplicand and each including register means for storing signals representative of at least one multiple generated in response to said different group of multiplier signals and said multiplicand signals;

a corresponding number of series connected levels of carry save adder means for generating sum and carry signals, each of said levels of carry save adder means being connected to a different one of said multiple generator circuits for summing with sum and carry signals from another one of said number of levels of carry save adder means the sets of multiple signals produced by said generator means to generate sum and carry signals, a last one of said levels of adder circuits being connected to apply said sum and carry signals to a first one of said levels of adder means; and, timing control means for generating clock signals defining cycles of operation when said sets of multiple signals produced by said generator circuits are simultaneously applied to each of said levels, said timing control means including circuit means coupled to said plurality of multiple generating means, said circuit means generating said clock signals for enabling each of said multiple generator means to overlap the generation of said sets of multiple signals with the summing of sets of multiple signals produced during previous cycles thereby minimizing the number of cycles for performing said multiplication operation.

2. The system of claim 1 wherein said system further includes:
first and second register means connected to said carry save adder means of a last one of said levels and means connecting said first and second register means to said carry save adder means of a first level for summing said carry and sum signals to the set of multiple signals selected by a next group of multiplier signals.

3. The system of claim 2 wherein said system further includes an adder connected to said first and second register means, said adder being operative to sum said stored sum and carry signals during successive cycles to produce a final product.

4. The system of claim 1 wherein said timing control means further includes mode control means for generating signals indicating when said system is being operated in first and second modes, said circuit means being conditioned by said control signals to decrease the duration of said cycles minimizing said time for performing said multiplication operation.

5. The system of claim 1 wherein each of said plurality of multiple generator means further includes:
decoder means connected to receive a corresponding group of said multipler signals; and,
a number of selectable gate circuit means for producing different multiples within said set of multiple signals, each gate circuit means being connected to receive said multiplicand signals and being connected to said decoder means for selection of said multiples in accordance with said group of multiplier signals; and, wherein said register means for storing includes:
a plurality of latch circuit means operatively connected to each of said gate circuit means for storing signals representative of a selected multiple, said plurality of latch circuit means being connected to said timing control means; said plurality of latch circuits of each of said generator means being conditioned by said clock signals to store a multiple produced by selected ones of said gate circuit means selected during a previous cycle of operation.

6. The system of claim 5 wherein said multiplier and multiplicand each includes a predetermined number of digits and wherein each of said gate circuit means includes a number of input terminals corresponding in number to at least one more than the number of multiplicand digits,
said number of input terminals of a first predetermined number of said gate circuit means being connected to receive signals corresponding to said multiplicand digits in the order received by said system; and,
said number of input terminals of a second predetermined number of said gate circuit means being connected to receive said signals corresponding to said multiplicand digits shifted by one bit from said order received by said system.

7. The system of claim 6 wherein first and second predetermined number of gate circuit means is two and wherein said signals received by said number of input terminals of each of said second predetermined number of gate circuit means are shifted in the same predetermined direction.

8. The system of claim 7 wherein said same predetermined direction is one bit to the right and wherein said first and second predetermined number of gate circuit means are conditioned to apply multiple signals to said plurality of latch circuit means corresponding to $\pm 1$ times said multiplicand and $\pm\frac{1}{2}$ times said multiplicand, respectively.

9. The system of claim 8 wherein each said different group of signals of said multiplier corresponds to at least a different pair of multiplier bits and the least significant multiplier bit from a group of multiplier digits applied to the multiple generator means of a succeeding level; and,
said system being operative to process during each cycle of operation a number of multiplier digits corresponding to said number of levels times the number of digits in said different group of signals minus one.

10. The system of claim 9 wherein each of said levels is connected to form an array, said array being arranged such that the number of said carry save adder means of each level is two wider at each end than the number of carry save adder means of preceding level for applying said multiple signals from all of said multiple generator means to said carry save adder circuits for proper generation of said sum and carry signals of said partial product.

11. A high speed multiplication system for performing a binary multiplication operation upon signals corresponding to a multiplier and multiplicand, said system comprising:
a plurality of multiple generator and storage circuits for generating signals corresponding to different multiples of said multiplicand, each of said plurality of multiple generator circuits being connected to receive a different group of said signals of said multiplier and said signals of said multiplicand and each including means for storing signals representative of at least one multiple generated during a previous cycle in response to said different multiplier signals and said multiplicand signals;
a corresponding number of series connected levels of carry save adder circuits for generating sum and carry signals, each of said levels of carry save adder circuits being connected to at least one of said multiple generator circuits for summing with sum and carry signals from another one of said number of levels of carry save adder circuits, the sets of multiple signals generated by said one of said circuits to produce sum and carry signals corresponding to a final product, a last one of said levels of adder circuits being connected to apply the sum and carry signals to a first level of said adder circuits; and,
timing control means for generating clock signals establishing time intervals for applying said sets of signals generated by said generator circuits simultaneously to said levels of carry save adder circuits during a cycle of operation, said timing control means including circuit means coupled to said plurality of multiple generator means, said circuit means generating said clock signals to enable each of said multiple generator circuits to overlap the generation of said sets of multiple signals with the summing of sets of multiple signals produced during previous cycles thereby minimizing the time for performing said multiplication operation.

12. The system of claim 11 wherein said system further includes:
    a first register connected to store the sum signals received from said last level of said carry save adder circuits;
    a second register connected to store the carry signals received from said last one of said levels of carry save adder circuits; and,
    means connecting said first and second registers to said carry save adder circuits of a first one of said levels for summing said carry and sum signals representative of a partial product to the set of multiples generated for a next group of multiplier signals.

13. The system of claim 12 wherein said system further includes an adder connected to said first and second registers, said adder being operative to sum said stored sum and carry signals during successive cycles to produce a final product.

14. The system of claim 11 wherein said timing control means further includes mode control means for generating signals indicating when said system is being operated in first and second modes, said circuit means being conditioned by said control signals to increase the rate of said clock signals minimizing said time for performing said multiplication operation.

15. The system of claim 11 wherein each of said plurality of multiple generator circuits further includes:
    a decode circuit connected to receive a corresponding group of said multiplier signals; and
    a number of selectable gate circuits for generating different multiple signals within said set of multiple signals, each gate circuit connected to receive said multiplicand signals and each being connected to said decode circuit for selection in accordance with said group of multiplier signals; and, wherein each of said means for storing includes
    a plurality of latch circuits operatively connected to each of said gate circuits for storing signals representative of a selected multiple, said plurality of latch circuits being connected to said timing control means, said plurality of latch circuits of each said generator circuits being conditioned by said clock signals to store said multiple signals applied by corresponding ones of said gate circuits selected by each said decode circuit during said previous cycle.

16. The system of claim 15 wherein said multiplier and multiplicand each includes a predetermined number of bits and wherein each of said gate circuits includes a number of input terminals corresponding in number to at least one moe han the number of multiplicand bits processed during said multiplication operation,
    said number of input terminals of a first predetermined number of said gate circuits being connected to receive signals corresponding to said multiplicand bits in the order received by said system; and,
    said number of input terminals of a second predetermined number of said gate circuits being connected to receive said signals corresponding to said multiplicand bits shifted by one bit position from said order received by said system.

17. The system of claim 16 wherein first and second predetermined number of gate circuits is two and wherein said signals received by said number of gate circuits is shifted in the same predetermined direction.

18. The system of claim 17 wherein said same predetermined direction is one bit position to the right and wherein said first and second predetermined number of gate circuits are conditioned to apply multiple signals to said plurality of latch circuits corresponding to $\pm 1$ times said multiplicand and $\pm \frac{1}{2}$ times said multiplicand, respectively, and wherein another one of said selectable gate circuits is conditioned to apply multiple signals to said plurality of latch circuits corresponding to 0 times said multiplicand.

19. The system of claim 15 wherein each said different group of signals of said multiplier corresponds to at least a different pair of multiplier bits and the least significant multiplier bit from the group of multiplier bits applied to the multiple generator circuit of a succeeding level; and,
    said system being operative to process during each cycle of operation a number of multiplier bits corresponding to said number of levels of carry save adder circuits times the number of bits in said different group of signals minus one.

20. The system of claim 19 wherein each of said levels of carry save adder circuits is connected to form an array, said array being arranged such that the number of said carry save adder circuits of each level is two larger at each end than the number of carry save adder circuits from a preceding level for applying said multiple signals from said multiple generator circuits to the proper carry save adder circuits of each of said levels for proper generation of said sum and carry signals of said final product.

21. The system of claim 20 wherein said decode circuit of each of said multiple generator circuits in response to each said group of multiplier bits is conditioned to select in accordance with different values of said group of multiplier bits multiples having the following values:

| Multiplier Bit Value | Multiples |
| --- | --- |
| 000 | zero times multiplicand |
| 001 | $\frac{1}{2}$ times multiplicand |
| 010 | $\frac{1}{2}$ times multiplicand |
| 011 | 1 times multiplicand |
| 100 | −1 times multiplicand |
| 101 | −$\frac{1}{2}$ times multiplicand |
| 110 | −$\frac{1}{2}$ times multiplicand |
| 111 | zero times multiplicand. |

22. The system of claim 21 wherein said system further includes carry generation circuit means connected to receive each said group of multiplier bits, said carry generation circuit means including means connected to said carry save adder circuits of different ones of said levels, said circuit means including circuits for generating binary ONE carry in signals for positive multiples and binary ZERO carry in signals for negative multiples completing summing of said multiples.

23. The system of claim 20 wherein said system further includes:
    microprogrammed control means responsive to an instruction coded to specify a multiplication operation to load an output register with a first microinstruction word coded to condition said system for said multiplication operation;

register means for receiving said multiplier signals, said register means being connected to each of said multiple generator circuits;

decoder means connected to said microprogrammed control means for generating control signals in response to said microinstruction word; and, counter means connected to said decoder means and to said register mens, said counter means being conditioned by said control signals from said decoder means to be forced to a first predetermined count defining said number of cycles and to be decremented by one during each cycle of operation, said counter means conditioning said register means for applying numbers of different groups of multiplier signals to said multiple generator circuits during successive cycles of operation until said counter means is decremented from said first predetermined count to a second predetermined count indicating the completion of processing all of said multiplier bits.

24. The method of performing a multiplication operation by a plurality of series connected carry save adders upon signals corresponding to a multiplier and a multiplicand, said method comprising the steps of:

a. generating simultaneously by a plurality of multiple generator means a first set of signals corresponding to multiples of said multiplicand designated by a number of first groups of multiplier signals during a first cycle of operation;

b. storing said first set of multiple signals in said plurality of multiple generator means during a next cycle of operation;

c. applying different ones of said multiples of said set to each of said carry save adders during said next cycle; and, d. generating simultaneously by said plurality of multiple generator means a second set of multiples designated by a number of second groups of said multiplier signals during said next cycle of operation to overlap the generation of said second set of multiple signals with the summing of said first set of multiple signals by said plurality of carry save adder networks to minimize the number of cycles for performing said multiplication operation.

25. The method of claim 24 wherein said method further includes the step of repeating steps a through d for each different number of groups of multiplier signals which comprise said multiplier.

* * * * *

UNITED STATES PATENT OFFICE
CERTIFICATE OF CORRECTION

Patent No. 4,041,292   Dated August 9, 1977

Inventor(s) Jerry L. Kindell

It is certified that error appears in the above-identified patent and that said Letters Patent are hereby corrected as shown below:

Column 25, line 59, delete "moe han" and insert --more than--.

Column 27, line 10, delete "mens" and insert --means--.

Signed and Sealed this

Twenty-second Day of August 1978

[SEAL]

Attest:

RUTH C. MASON
Attesting Officer

DONALD W. BANNER
Commissioner of Patents and Trademarks